(12) United States Patent
Gu

(10) Patent No.: US 9,838,312 B2
(45) Date of Patent: Dec. 5, 2017

(54) METHOD AND APPARATUS FOR IMPROVING FORWARDING PERFORMANCE OF CHIP

(71) Applicant: ZTE CORPORATION, Shenzhen, Guangdong Province (CN)

(72) Inventor: Xia Gu, Shenzhen (CN)

(73) Assignee: XI'AN ZHONGXING NEW SOFTWARE CO., LTD, Xi'An (CN)

( * ) Notice: Subject to any disclaimer, the term of this patent is extended or adjusted under 35 U.S.C. 154(b) by 202 days.

(21) Appl. No.: 14/762,227

(22) PCT Filed: Jan. 16, 2014

(86) PCT No.: PCT/CN2014/070703
§ 371 (c)(1),
(2) Date: Jul. 21, 2015

(87) PCT Pub. No.: WO2014/111025
PCT Pub. Date: Jul. 24, 2014

(65) Prior Publication Data
US 2015/0350073 A1 Dec. 3, 2015

(30) Foreign Application Priority Data
Jan. 21, 2013 (CN) .......................... 2013 1 0021553

(51) Int. Cl.
*H04L 12/741* (2013.01)
*G06N 99/00* (2010.01)
(Continued)

(52) U.S. Cl.
CPC ........... *H04L 45/74* (2013.01); *G06N 99/005* (2013.01); *H04L 12/4645* (2013.01); *H04L 12/6418* (2013.01); *H04L 61/6022* (2013.01)

(58) Field of Classification Search
CPC .......... G06F 13/4022; G06F 8/10; G06F 8/20; G06F 8/30; G06F 8/65; G06F 8/67;
(Continued)

(56) References Cited

U.S. PATENT DOCUMENTS

2009/0279440 A1  11/2009  Wong et al.

FOREIGN PATENT DOCUMENTS

CN  1829188 A  9/2006
CN  1889455 A  8/2008
(Continued)

OTHER PUBLICATIONS

European Search Report dated Feb. 1, 2016 in European Patent Application No. EP14741146.6.

*Primary Examiner* — Patrice Winder
*Assistant Examiner* — Abderrahmen Chouat
(74) *Attorney, Agent, or Firm* — Plumsea Law Group, LLC

(57) ABSTRACT

A method and apparatus for improving forwarding performance of a chip are disclosed. The method includes: when a chip receives a message, judging whether the message is a protocol message required to be processed, if the message is the protocol message required to be processed, performing MAC learning, and if the message is not the protocol message required to be processed, determining whether to perform learning after performing calculation according to a current actual time value of the chip and a preset empirical value. The apparatus includes: a first judgment module and a second judgment module. With the method and apparatus of the embodiments of the present document, an MAC learning intensity of the chip can be relieved to a great extent, thereby improving the forwarding performance of the chip.

8 Claims, 2 Drawing Sheets

(51) Int. Cl.
*H04L 29/12* (2006.01)
*H04L 12/64* (2006.01)
*H04L 12/46* (2006.01)

(58) Field of Classification Search
CPC .. G06F 1/3203; G06F 1/324; G06F 2205/064; G06F 5/065; G06F 3/044; G06F 9/547; H04L 49/351; H04L 47/10; H04L 49/352; H04L 45/245; H04L 49/354; H04L 45/742; H04L 47/2458; H04L 49/254; H04L 49/90; H04L 47/2441; H04L 47/2408; H04L 12/18; H04L 45/00; H04L 49/602
See application file for complete search history.

(56) References Cited

FOREIGN PATENT DOCUMENTS

| | | | | |
|---|---|---|---|---|
| CN | 101645904 A | 2/2010 | | |
| CN | WO 2011029361 A1 | * 3/2011 | ............ | H04L 49/90 |
| CN | 103117928 A | 5/2013 | | |
| WO | 2005067532 A2 | 7/2005 | | |
| WO | 2014/111025 A1 | 7/2014 | | |

\* cited by examiner

METHOD AND APPARATUS FOR IMPROVING FORWARDING PERFORMANCE OF CHIP

CROSS-REFERENCE TO RELATED APPLICATION(S)

This application is the U.S. National Phase application of PCT application number PCT/CN2014/070703 having a PCT filing date of Jan. 16, 2014, which claims priority of Chinese patent application 201310021553.0 filed on Jan. 21, 2013, the disclosures of which are hereby incorporated by reference.

TECHNICAL FIELD

The present document relates to the field of communication technology, and particularly, to a method and apparatus for improving forwarding performance of a chip.

BACKGROUND OF THE RELATED ART

In switching equipment forwarding, a Medium Access Control (MAC) learning module plays an important role in the switch forwarding. With the continuous extension of the Internet, the number of MAC table entries is increasing, and generally the MAC table entries are all implemented through HASH, which directly causes that the performance of looking up and learning an MAC table is much lower.

At present, the switching equipment is required to perform source MAC checking, judging and learning on all the received messages, thus the whole forwarding performance of the messages will be greatly reduced, so that the forwarding performance of the messages cannot meet the requirements.

SUMMARY

The embodiments of the present document provide a method and apparatus for improving forwarding performance of a chip, to solve the problem of poorer forwarding performance resulted from that it is required to perform source MAC checking, judging and learning on all messages in the related art.

The embodiment of the present document provides a method for improving forwarding performance of a chip, which comprises:

when a chip receives a message, judging whether the message is a protocol message required to be processed, if the message is the protocol message required to be processed, performing medium access control MAC learning, and if the message is not the protocol message required to be processed, determining whether to perform learning after performing calculation according to a current actual time value of the chip and a preset empirical value.

Alternatively, judging whether the message is a protocol message required to be processed comprises:

judging whether the message is a message reported to a Central Processing Unit (CPU), and if the message is the message reported to the CPU, determining that the message is the protocol message required to be processed.

Alternatively, determining whether to perform learning after performing calculation according to a current actual time value of the chip and a preset empirical value comprises:

performing modulus operation of the current actual time value of the chip mod the preset empirical value, judging whether a modulus result is 0, if the modulus result is 0, processing the message according to a normal flow after performing MAC learning, and if the modulus result is not 0, directly processing the message according to the normal flow.

Alternatively, the preset empirical value is determined according to forwarding performance and learning performance of the chip itself.

Alternatively, the preset empirical value is 12.

The embodiment of the present document further provides an apparatus for improving forwarding performance of a chip, which comprises: a first judgment module and a second judgment module, wherein:

the first judgment module is configured to: when a chip receives a message, judge whether the message is a protocol message required to be processed, if the message is the protocol message required to be processed, trigger to perform medium access control MAC learning, and if the message is not the protocol message required to be processed, trigger the second judgment module; and the second judgment module is configured to: determine whether to perform learning after performing calculation according to a current actual time value of the chip and a preset empirical value.

Alternatively, the first judgment module is configured to judge whether the message is a protocol message required to be processed by means of:

when the chip receives the message, judging whether the message is a message reported to a central processing unit CPU, if the message is the message reported to the CPU, determining that the message is the protocol message required to be processed and triggering to perform MAC learning, and if the message is not the message reported to the CPU, triggering the second judgment module.

Alternatively, the second judgment module is configured to determine whether to perform learning after performing calculation according to a current actual time value of the chip and a preset empirical value by means of:

performing modulus operation of the current actual time value of the chip mod the preset empirical value, judging whether a modulus result is 0, if the modulus result is 0, processing the message according to a normal flow after triggering to perform MAC learning, and if the modulus result is not 0, directly triggering the normal flow to process the message.

Alternatively, the preset empirical value is determined according to forwarding performance and learning performance of the chip itself. Alternatively, the preset empirical value is 12.

With the method and apparatus of the embodiments of present document, an MAC learning intensity of the chip can be relieved to a great extent, thereby improving the forwarding performance of the chip.

PREFERRED EMBODIMENTS OF THE INVENTION

The preferred embodiments of the present document will be described in combination with the accompanying drawings below, wherein, the accompanying drawings constitute a part of the present application, and they are used for explaining the principle of the embodiments of the present document with the embodiments of the present document.

First, the method according to the embodiment of the present document will be described in detail in combination with the accompanying drawing 1.

Figure 1:
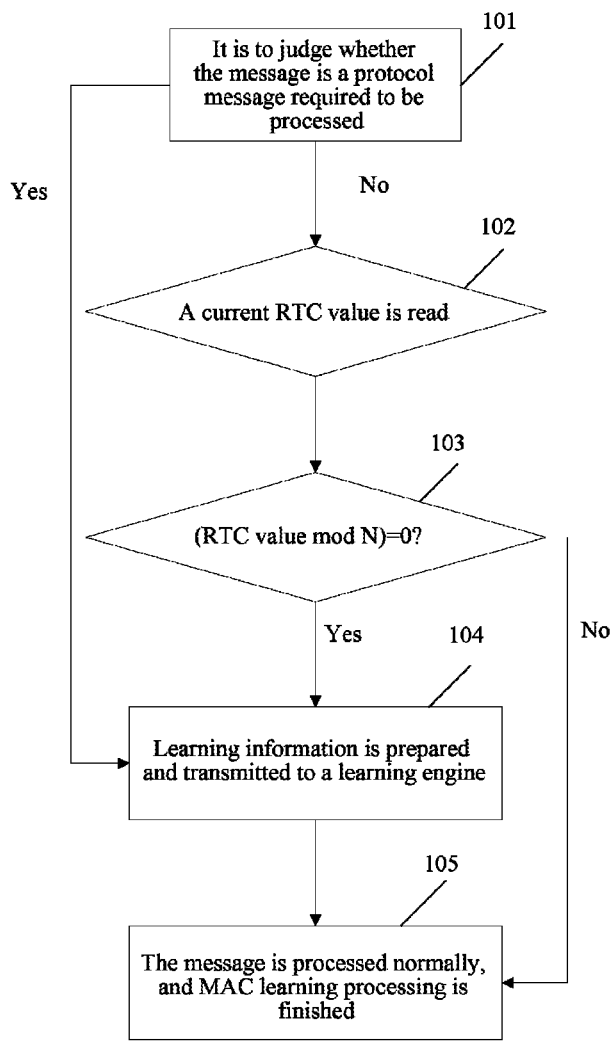
FIG. 1 is a schematic diagram of a flow of the method according to the embodiment of the present document.

As shown in FIG. 1, FIG. 1 is a schematic diagram of a flow of the method according to the embodiment of the present document, and the following steps can be included.

In step 101, when a chip receives a message, it is to judge whether the message is a protocol message required to be processed by a device to which the chip belongs (namely a message required to be reported to a CPU), and if the message is the protocol message required to be processed by the device to which the chip belongs, step 104 is executed, and if the message is not the protocol message required to be processed by the device to which the chip belongs, step 102 is executed.

In step 102, a current Real Time Clock (RTC) value of the chip, namely a sampling point of MAC learning, is read, and then step 103 is executed.

In step 103, it is to perform modulus operation of the current RTC value mod an empirical value N (e.g. 12), and judge whether a result is 0, if the result is 0, step 104 is executed; and if the result is not 0, step 105 is executed; wherein, the empirical value is determined by the technicians according to forwarding performance and learning performance of the chip itself, and empirical values of different types of chips may be different.

In step 104, related information of the MAC learning is prepared and transmitted to a TOPlearn engine (i.e. an NP4 learning engine) to be learnt, the learning engine performs learning processing, step 105 is executed.

In step 105, the message is processed according to normal message processing flows, such as forwarding and so on.

Next, the apparatus according to the embodiment of the present document will be described in detail in combination with the accompanying drawing 2.

Figure 2:
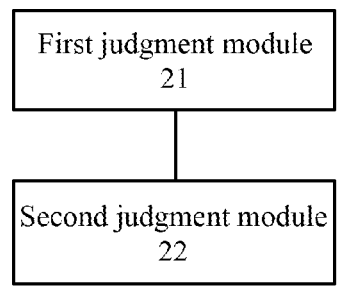
FIG. 2 is a schematic diagram of a structure of the apparatus according to the embodiment of the present document.

As shown in FIG. 2, FIG. 2 is a schematic diagram of a structure of the apparatus according to the embodiment of the present document, a first judgment module 21 and a second judgment module 22 can be included, wherein:

the first judgment module 21 is used to: when a chip receives a message, judge whether the message is a protocol message required to be processed, if the message is the protocol message required to be processed, trigger to perform MAC learning, and if the message is not the protocol message required to be processed, trigger the second judgment module 22;

the first judgment module 21 is used to judge whether the message is a protocol message required to be processed by means of: when the chip receives the message, judging whether the message is a message reported to a CPU, if the message is the message reported to the CPU, determining that the message is the protocol message required to be processed and triggering to perform MAC learning, and if the message is not the message reported to the CPU, triggering the second judgment module 22.

The second judgment module 22 is used to: determine whether to perform learning after performing calculation according to a current actual time value of the chip and a preset empirical value;

the second judgment module 22 is used to determine whether to perform learning after performing calculation according to a current actual time value of the chip and a preset empirical value by means of: performing modulus operation of the current actual time value of the chip mod the preset empirical value, judging whether a modulus result is 0, if the modulus result is 0, processing the message according to a normal flow after triggering to perform MAC learning, and if the modulus result is not 0, directly triggering the normal flow to process the message.

Wherein, the above preset empirical value is determined according to forwarding performance and learning performance of the chip itself, for example, the preset empirical value can be 12.

In conclusion, the embodiments of the present document provide a method and apparatus for improving forwarding performance of the chip, since data messages except protocol messages are all forwarded in group in actual network, generally a great deal of information is required to be switched in communication between two devices, that is, a large number of messages are continuously sent, therefore, it is only required to process a small part of messages through the MAC learning module in the method and apparatus of the embodiments of the present document, and it is not required to perform MAC learning processing on each message; moreover, even though messages simultaneously enter the chip in order, different messages will not enter the chip in a same time point, thus a clock value can be read as a sampling point, then the sampling point is calculated to obtain a sampling value, and it is to judge whether the message is required to be learnt according to the sampling value. Therefore, an MAC learning intensity of the chip can be relieved to a great extent, thereby improving the forwarding performance of the chip.

The above description is only the preferred embodiments of the present document, but the protection scope of the present document is not limited to this, changes or substitutions that can be easily conceived by any skilled familiar to the art within the technical scope disclosed by the present document shall be all covered within the protection scope of the present document. Therefore, the protection scope of present document should be subject to the protection scope of the claims.

INDUSTRIAL APPLICABILITY

With the method and apparatus of the embodiments of the present document, an MAC learning intensity of the chip can be relieved to a great extent, thereby improving the forwarding performance of the chip.

What is claimed is:

1. A method for improving forwarding performance of a chip, comprising:
   when the chip receives a message, judging whether the message is a protocol message required to be processed, if the message is the protocol message required to be processed, performing medium access control MAC learning, and if the message is not the protocol message required to be processed, determining whether to perform MAC learning after performing calculation according to a current actual time value of the chip and a preset empirical value;
   wherein, determining whether to perform MAC learning after performing calculation according to the current actual time value of the chip and the preset empirical value comprises:
   performing modulus operation of the current actual time value of the chip mod the preset empirical value, judging whether a modulus result is 0, if the modulus result is 0, processing the message according to a normal flow after performing MAC learning, and if the modulus result is not 0, directly processing the message according to the normal flow.

2. The method according to claim 1, wherein, judging whether the message is the protocol message required to be processed comprises:

judging whether the message is a message reported to a central processing unit CPU, and if the message is the message reported to the CPU, determining that the message is the protocol message required to be processed.

3. The method according to claim 1, wherein, the preset empirical value is determined according to forwarding performance and learning performance of the chip itself.

4. The method according to claim 3, wherein, the preset empirical value is 12.

5. An apparatus for improving forwarding performance of a chip, comprising the chip performing instructions stored in a non-transitory computer readable medium which executes steps in following modules: a first judgment module and a second judgment module, wherein:

the first judgment module is configured to: when the chip receives a message, judge whether the message is a protocol message required to be processed, if the message is the protocol message required to be processed, trigger to perform medium access control MAC learning, and if the message is not the protocol message required to be processed, trigger the second judgment module; and the second judgment module is configured to: determine whether to perform MAC learning after performing calculation according to a current actual time value of the chip and a preset empirical value;

wherein, the second judgment module is configured to determine whether to perform MAC learning after performing calculation according to the current actual time value of the chip and the preset empirical value by means of:

performing modulus operation of the current actual time value of the chip mod the preset empirical value, judging whether a modulus result is 0, if the modulus result is 0, processing the message according to a normal flow after triggering to perform MAC learning, and if the modulus result is not 0, directly triggering the normal flow to process the message.

6. The apparatus according to claim 5, wherein, the first judgment module is configured to judge whether the message is the protocol message required to be processed by means of:

when the chip receives the message, judging whether the message is a message reported to a central processing unit CPU, if the message is the message reported to the CPU, determining that the message is the protocol message required to be processed and triggering to perform MAC learning, and if the message is not the message reported to the CPU, triggering the second judgment module.

7. The apparatus according to claim 5, wherein, the preset empirical value is determined according to forwarding performance and learning performance of the chip itself.

8. The apparatus according to claim 7, wherein, the preset empirical value is 12.

* * * * *